United States Patent
Sommars et al.

(10) Patent No.: US 8,978,623 B2
(45) Date of Patent: Mar. 17, 2015

(54) DUAL FUEL INJECTOR HAVING FUEL LEAK SEALS

(75) Inventors: Mark F. Sommars, Sparland, IL (US); Hoisan Kim, Dunlap, IL (US); Xiangdong Ding, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 13/336,090

(22) Filed: Dec. 23, 2011

(65) Prior Publication Data
US 2013/0160741 A1 Jun. 27, 2013

(51) Int. Cl.
| | |
|---|---|
| F02M 43/04 | (2006.01) |
| F02D 19/06 | (2006.01) |
| F02M 43/00 | (2006.01) |
| F02M 55/00 | (2006.01) |
| F02M 69/46 | (2006.01) |

(52) U.S. Cl.
CPC ........... *F02M 43/04* (2013.01); *F02D 19/0647* (2013.01); *F02D 19/0689* (2013.01); *F02D 19/0694* (2013.01); *F02M 43/00* (2013.01); *F02M 55/004* (2013.01); *F02M 55/008* (2013.01); *F02M 2200/46* (2013.01); *Y02T 10/36* (2013.01)
USPC ...................................... 123/456; 239/533.11

(58) Field of Classification Search
CPC ................................................ F02M 2200/46
USPC ............. 239/533.11, 533.2–533.12; 123/490, 123/456
See application file for complete search history.

(56) References Cited

U.S. PATENT DOCUMENTS

| | | | | |
|---|---|---|---|---|
| 4,856,713 | A * | 8/1989 | Burnett | 239/113 |
| 5,199,398 | A | 4/1993 | Nylund | |
| 5,899,389 | A * | 5/1999 | Pataki et al. | 239/533.2 |
| 5,996,558 | A * | 12/1999 | Ouellette et al. | 123/506 |
| 6,260,775 | B1 * | 7/2001 | Lambert et al. | 239/533.3 |
| 6,298,833 | B1 | 10/2001 | Douville et al. | |
| 6,725,838 | B2 * | 4/2004 | Shafer et al. | 123/446 |
| 6,769,635 | B2 * | 8/2004 | Stewart et al. | 239/558 |
| 7,373,931 | B2 * | 5/2008 | Lennox et al. | 123/525 |
| 7,681,561 | B2 * | 3/2010 | Hilditch | 123/575 |
| 7,866,301 | B2 * | 1/2011 | Venkataraghavan et al. | 123/472 |
| 7,934,668 | B2 | 5/2011 | Cooke et al. | |
| 2006/0186226 | A1 * | 8/2006 | Boecking | 239/533.2 |
| 2009/0008480 | A1 | 1/2009 | Cooke | |
| 2009/0020631 | A1 * | 1/2009 | Mashida et al. | 239/533.3 |

FOREIGN PATENT DOCUMENTS

| | | | |
|---|---|---|---|
| GB | 2270346 A | * | 3/1994 |
| JP | 2009057884 | | 3/2009 |
| JP | 2009057884 A | * | 3/2009 |
| JP | 2009138580 | | 6/2009 |
| KR | 1020110133649 | | 1/2009 |
| WO | WO 2009/152602 | * | 12/2009 |
| WO | WO 2009152602 A1 | * | 12/2009 |

* cited by examiner

*Primary Examiner* — Lindsay Low
*Assistant Examiner* — Josh Campbell
(74) *Attorney, Agent, or Firm* — Uchendu O. Anyaso

(57) ABSTRACT

A dual fuel common rail fuel injector includes a first and second check needle used to selectively inject two different fuels such as diesel and liquefied natural gas. The fuel injector includes a fuel separator disposed in the interior cavity of the first check needle and is in sealing contact with the nozzle. The fuel separator is configured to prevent commingling of the diesel fuel and the liquefied natural gas. The fuel injector also includes at least one sealing member that is configured to prevent the diesel fuel from leaking from the diesel fuel check cavity into a gaseous fuel orifice.

20 Claims, 8 Drawing Sheets

DUAL FUEL INJECTOR HAVING FUEL LEAK SEALS

CROSS REFERENCE TO RELATED APPLICATION

This application is related to U.S. patent application Ser. No. 13/168,372, filed with the U.S. Patent and Trademark Office on Jun. 24, 2011, the entirety of which is incorporated herein by reference.

TECHNICAL FIELD

The present disclosure relates generally to dual fuel common rail systems, and more particularly to a dual fuel injector having concentric check valves.

BACKGROUND

Some dual fuel injectors utilize a concentric check valve scheme to inject each of the dual fuels (e.g., diesel and natural gas) into the combustion chamber. Such dual fuel injectors may be controlled by two actuators, with each actuator having a check valve that operates to inject fuel without interference from the other. However, in some of these dual fuel injectors, there is an issue of continuous diesel fuel leakage from the fuel cavity into the natural gas orifice, and then into the combustion chamber. Further, combustion gas intrusion after ignition is known to occur in some dual fuel injectors. U.S. Pat. No. 5,1999,398 issued to Nylund sought to address this issue. However, this reference fails to teach an injector that can independently receive two fluids, keep those fluids separate, and substantially prevent leaks of liquid fuel into the combustion chamber. Thus, it would be desirable to provide a more efficient dual fuel injector that substantially prevents the leakage of fuel into the combustion chamber, as well as alleviates combustion gas intrusion to the injector after ignition.

The present disclosure is directed toward one or more of the problems set forth above.

SUMMARY OF THE DISCLOSURE

In accordance with one embodiment, the present disclosure is directed to a dual fuel injector. The dual fuel injector includes an injector body, a nozzle, a first fuel check needle, a second fuel check needle, a fuel separator, and at least one sealing member. The injector body is configured to receive a first fuel and a second fuel. The nozzle is configured with a first set of orifices for injecting the first fuel and a second set of orifices for injecting the second fuel. The first fuel check needle is disposed in a first fuel check cavity, wherein the first fuel check needle defines an interior cavity. The second fuel check needle is positioned within the interior cavity of the first fuel check needle. The second fuel check needle is movable within a second fuel check cavity. The fuel separator configured with a first end and a second end is disposed in the interior cavity between the first fuel check needle and the second fuel check needle. The second end of the fuel separator is disposed in sealing contact with the nozzle. The fuel separator is configured to prevent commingling of the first fuel and the second fuel. At least one sealing member is configured to prevent the second fuel from leaking from the second fuel check cavity into the first set of orifices.

In another aspect, a dual fuel common rail fuel system including a first fuel source, a second fuel source, a first fuel rail, a second fuel rail, at least one first fuel pump configured to pressurize the first fuel from the first fuel source and deliver the first fuel to the first fuel rail, at least one second fuel pump configured to pressurize the second fuel from the second fuel source and deliver the second fuel to the second fuel rail, and a dual fuel injector configured to fluidly couple to the first rail and to the second fuel rail. The dual fuel injector includes an injector body, a nozzle, a first fuel check needle, a second fuel check needle, a fuel separator, and at least one sealing member. The injector body that is configured to receive a first fuel from the first fuel source and a second fuel from the second fuel source. The nozzle is configured with a first set of orifices for injecting the first fuel and a second set of orifices for injecting the second fuel. The first fuel check needle is disposed in a first fuel check cavity, wherein the first fuel check needle defines an interior cavity. The second fuel check needle is positioned within the interior cavity of the first fuel check needle. The second fuel check needle is movable within a second fuel check cavity. The fuel separator configured with a first end and a second end is disposed in the interior cavity between the first fuel check needle and the second fuel check needle. The second end of the fuel separator is disposed in sealing contact with the nozzle. The fuel separator is configured to prevent commingling of the first fuel and the second fuel. At least one sealing member is configured to prevent the second fuel from leaking from the second fuel check cavity into the first set of orifices.

DETAILED DESCRIPTION

Figure 1:
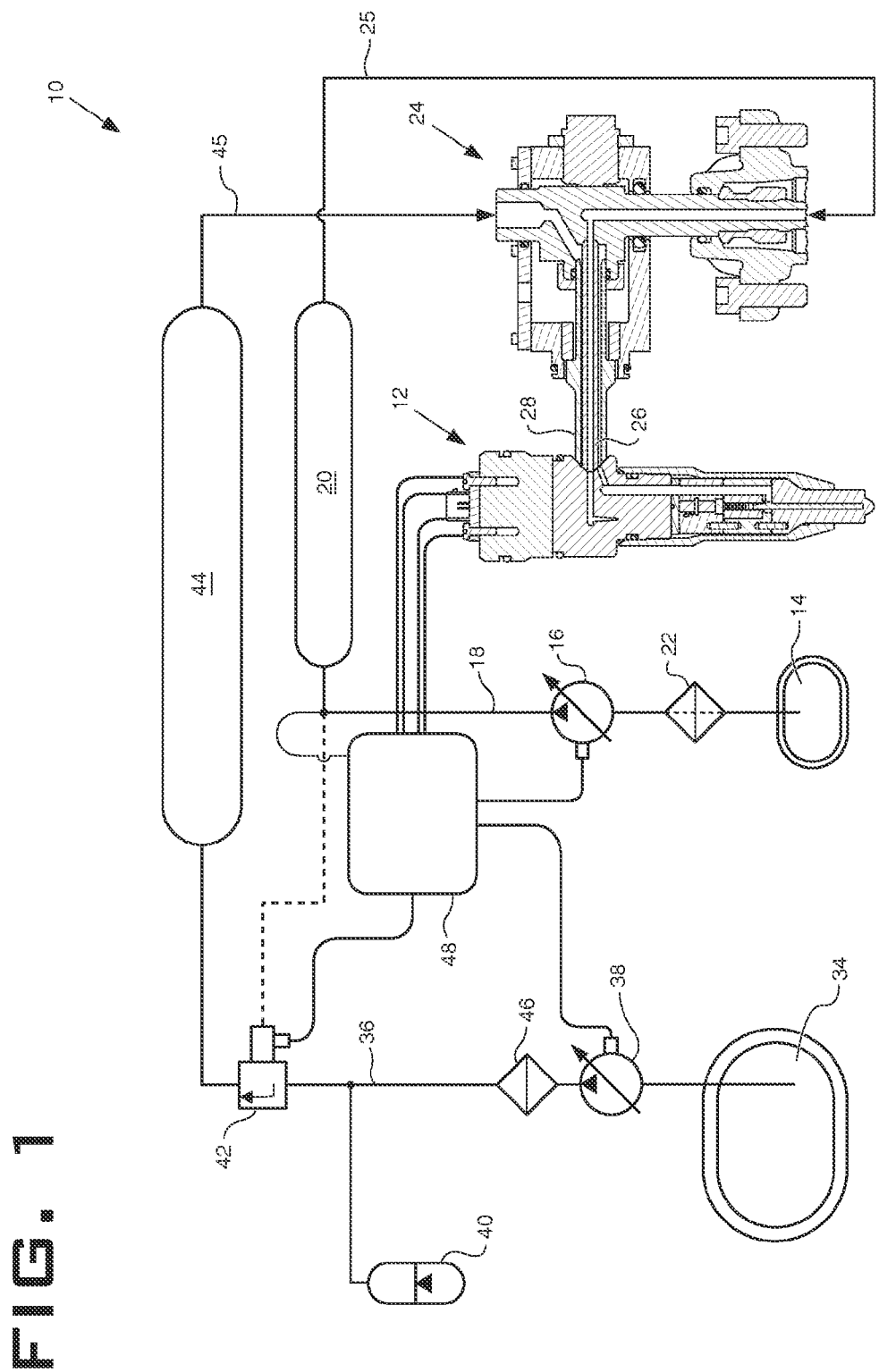
FIG. 1 is a diagrammatic schematic of a fuel system incorporating a dual fuel common rail injector.
Figure 2:
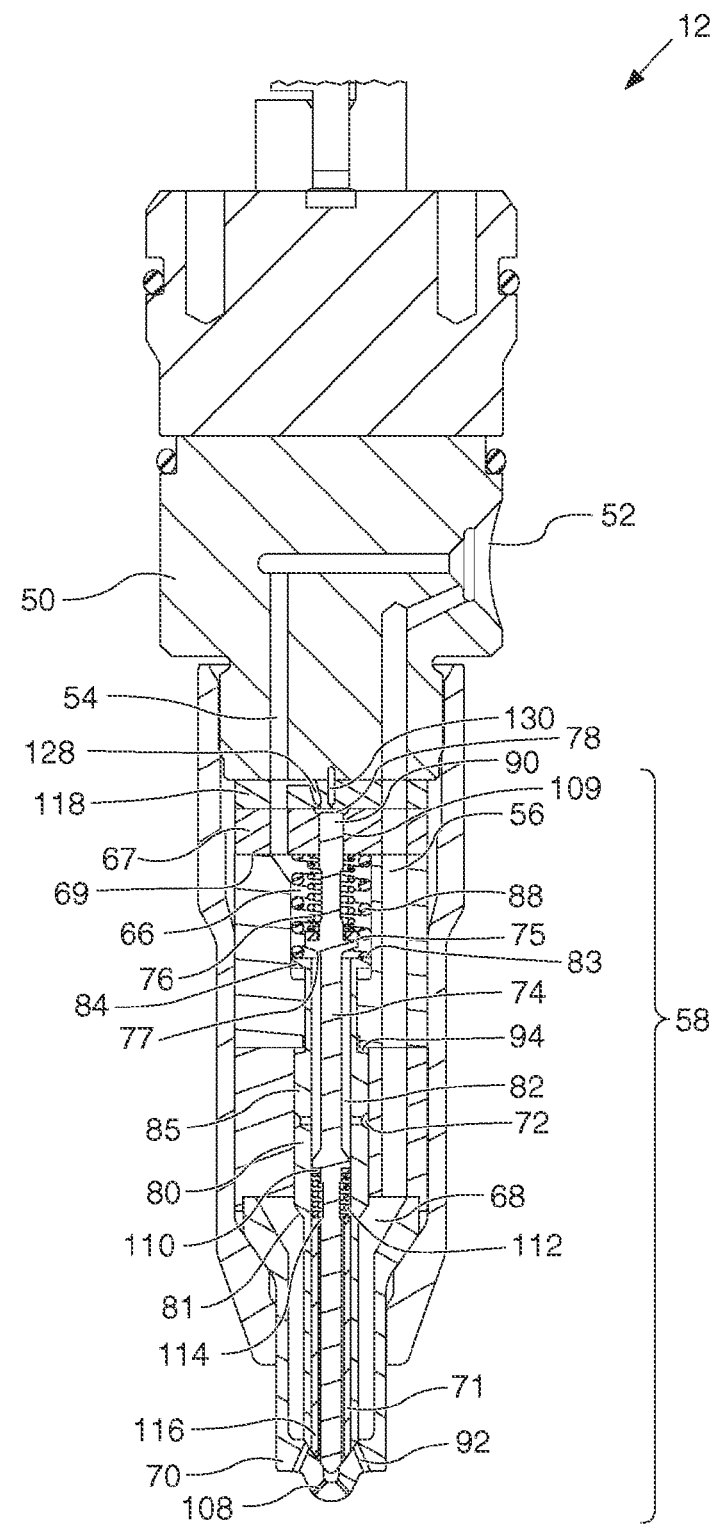
FIG. 2 is a cross section of a dual fuel injector according to a first embodiment.
Figure 3:
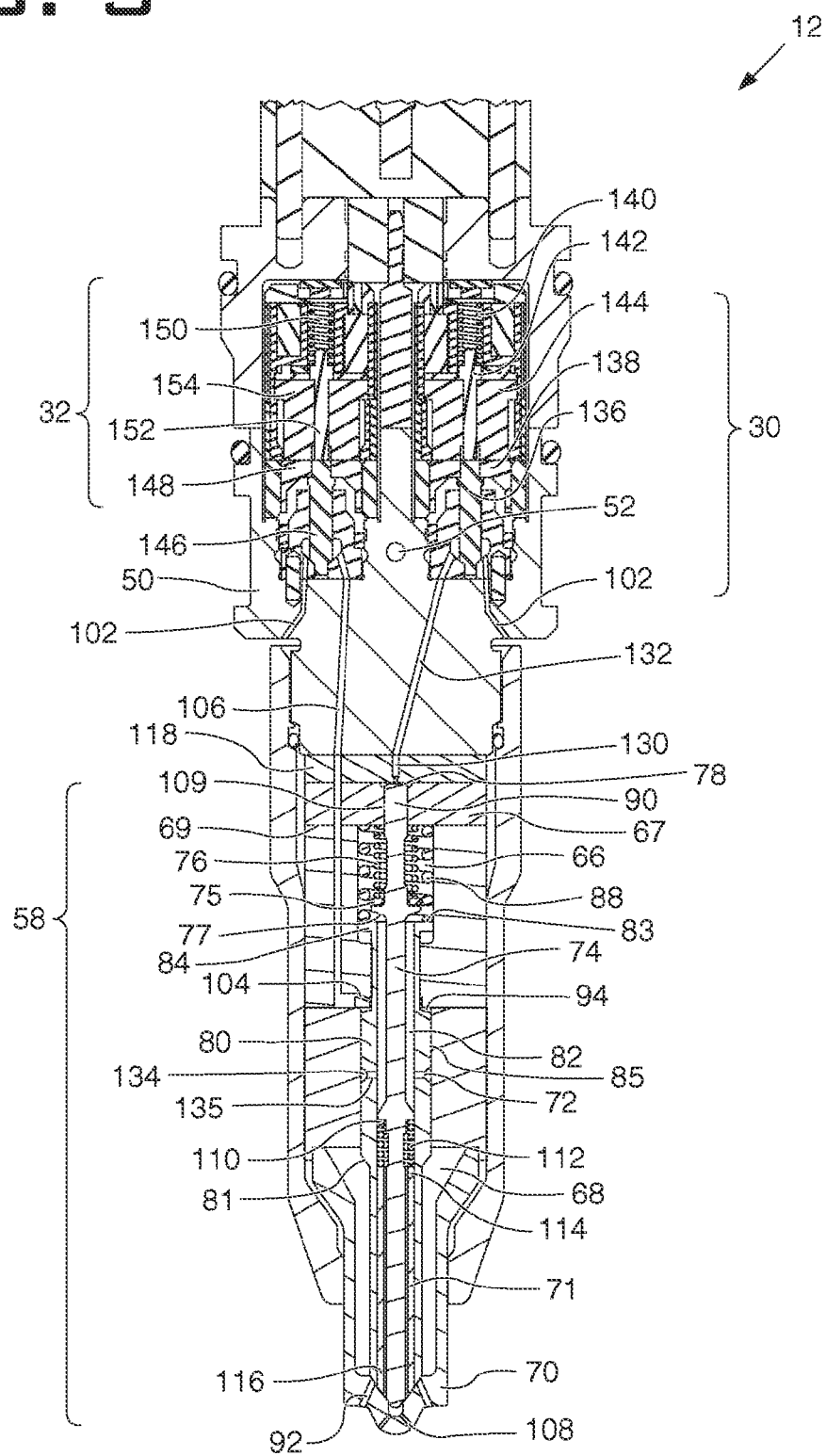
FIG. 3 is a differently oriented cross section of the dual fuel injector according to the first embodiment.

Referring to FIG. 1, a dual fuel common rail fuel system 10 utilizing a dual fuel common rail injector 12 is shown. For ease of discussion, the dual fuel common rail injector will be referred to as "injector 12". A diesel fuel source 14 contains diesel fuel. A diesel pump 16 draws diesel fuel through diesel supply line 18; pressurizes the diesel fuel; and delivers the pressurized diesel fuel to a diesel fuel rail 20. A filter 22 may be disposed in the diesel supply line 18 upstream of the diesel pump 16 and downstream of the diesel fuel source 14. Diesel fuel within the diesel fuel rail 20 may be pressurized to a pressure of approximately 40 MPa. Pressurized diesel fuel from the diesel fuel rail 20 may then be delivered to a quill assembly 24 via diesel fuel line 25. Quill assembly 24 is configured to receive both diesel fuel and a gaseous fuel such as liquefied natural gas. Those skilled in the art will recognize that the gaseous fuel may be any gaseous fuel such as natural gas, propane, methane, liquefied petroleum gas (LPG), synthetic gas, landfill gas, coal gas, biogas from agricultural anaerobic digesters, or any other gaseous fuel. Quill assembly 24 may further be a coaxial type wherein diesel fuel is disposed within a first quill tube 26, which is disposed within a second quill tube 28 also carrying gaseous fuel. Diesel fuel from quill assembly 24 is then delivered to injector 12. As shown in FIGS. 2 and 3, diesel fuel supplied to injector 12 is both injected and also functions as a control medium for the diesel control valve assembly 30 and the gaseous control valve assembly 32 of injector 12.

Dual fuel common rail fuel system 10 further includes a gaseous fuel source 34. Gaseous fuel, such as liquefied natural gas may be stored at relatively low temperatures and pressures (−160° C. and 100 kPa). Because gaseous fuel may be stored under such temperatures and pressures, it may be necessary for the gaseous fuel to be kept in a vacuum insulated tank. Gaseous fuel is drawn from gaseous fuel source 34 through a gaseous supply line 36 by a fuel pump 38. Fuel pump 38 may be a variable displacement cryogenic pump. Fuel pump 38 pressurizes and delivers gaseous fuel to an accumulator 40 via gaseous supply line 36. A filter 46 may filter contaminants within gaseous supply line 36. A pressure regulator 42 ensures that gaseous fuel delivered to a gaseous fuel rail 44 is at a pressure that is at least 5 MPa below that of the diesel fuel within the diesel fuel rail 20 via gaseous fuel line 45. For example, within the dual fuel common rail fuel system 10, diesel fuel within the diesel fuel rail 20 may be at a pressure of 40 MPa, while gaseous fuel within the gaseous fuel rail 44 may be at a pressure of 35 MPa.

An electronic control module (ECM) 48 may control various components of dual fuel common rail fuel system 10. For example, the ECM may control the diesel control valve assembly 30 and the gaseous control valve assembly 32 of injector 12. Likewise, the ECM may also control components such as the diesel pump 16, fuel pump 38, and pressure regulator 42. Those skilled in the art will recognize that fuel system may further include other components that can also be controlled by ECM 48.

Turning now to FIGS. 2 and 3, which depict the internal structure and fluid circuitry of injector 12 according to a first embodiment. In particular, an injector body 50 defines a coaxial dual fuel supply inlet 52. Dual fuel supply inlet 52 is configured to receive the concentric first and second quill tubes 26, 28. Injector body 50 further defines a diesel fuel supply passage 54 and a gaseous fuel supply passage 56 both of which fluidly connect to the dual fuel inlet 52. In the embodiment shown, first quill tube 26 delivers diesel to the dual fuel inlet 52 where it fluidly connects to diesel fuel supply passage 54. Similarly, second quill tube 28 delivers gaseous fuel to the dual fuel inlet 52, where it fluidly connects to gaseous fuel supply passage 56.

Figure 4:
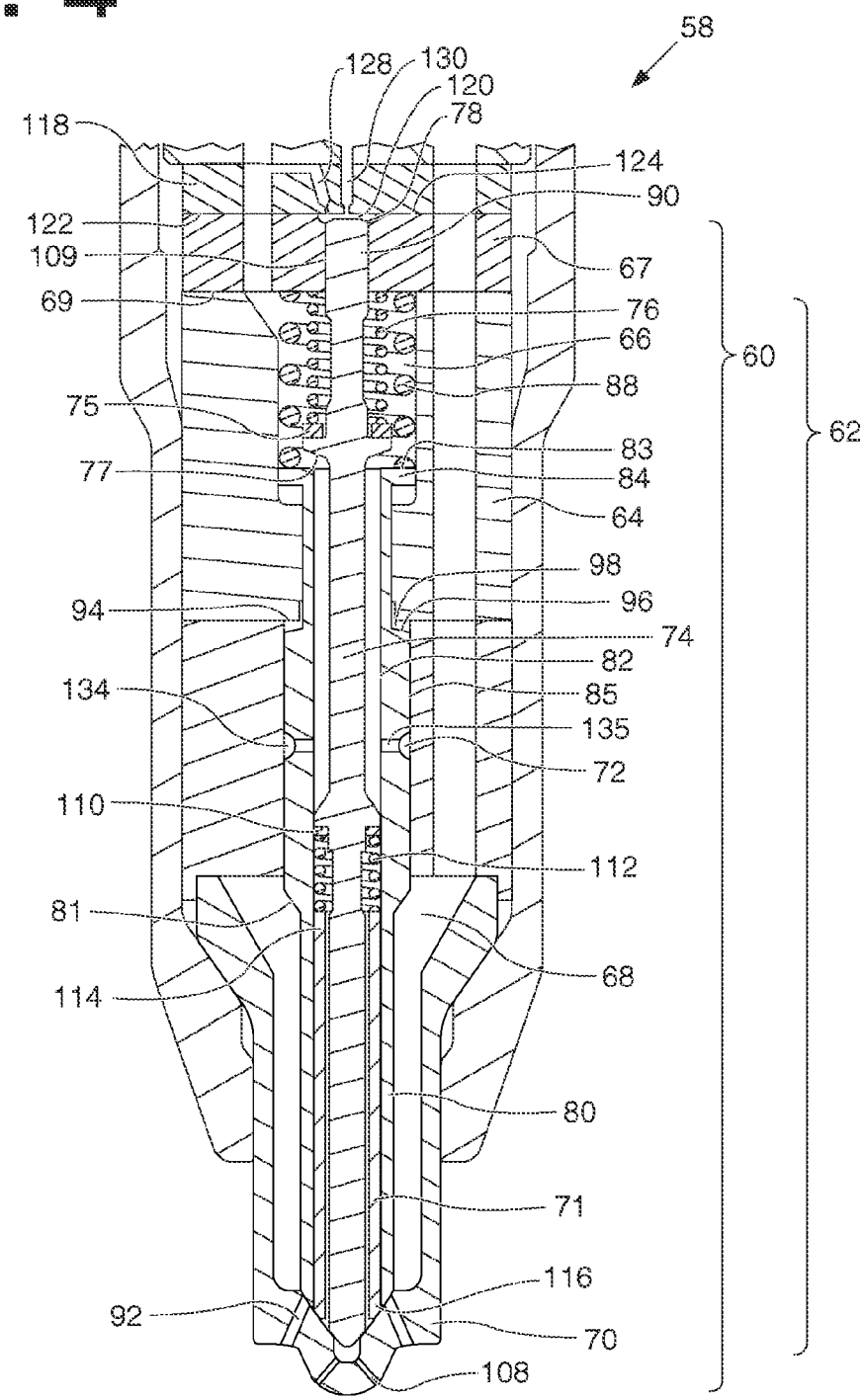
FIG. 4 is a detail view of a nozzle group of the dual fuel injector according to the first embodiment.
Figure 5:
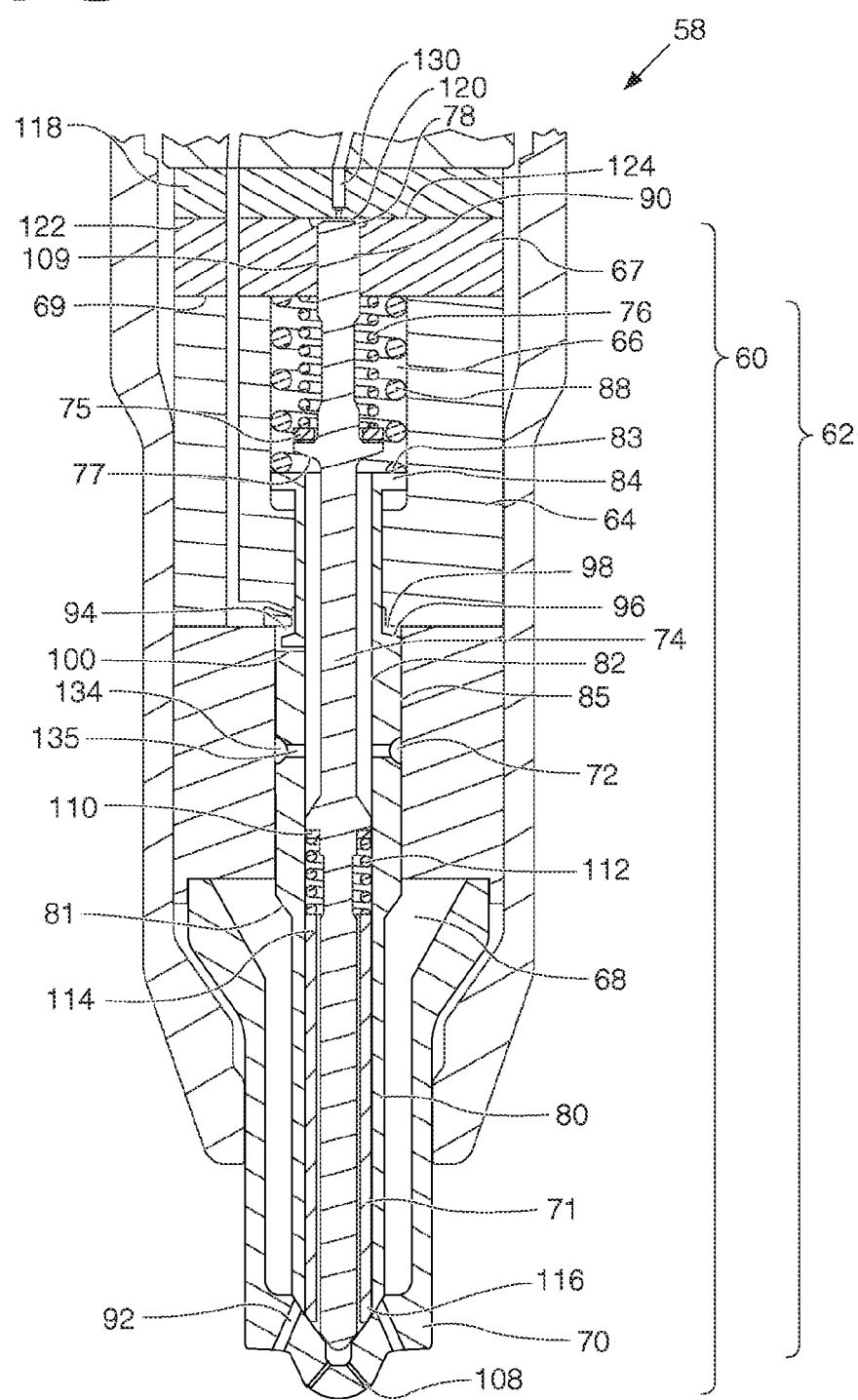
FIG. 5 is a differently oriented detail view of the nozzle group of the dual fuel injector according to the first embodiment.

As shown in greater detail in FIGS. 4 and 5, injector 12 further includes a nozzle assembly 58. The nozzle assembly 58 of this embodiment is commonly referred to as concentric, because of the way the diesel check needle assembly 60 is concentrically positioned within the gaseous check needle assembly 62. The nozzle assembly 58 includes a nozzle body 64 that defines a gaseous fuel cavity 68 and partially defines a diesel fuel cavity 66. The nozzle assembly 58 further includes a diesel check needle guide 67. A lower surface 69 of diesel check needle guide 67 partially defines the diesel fuel cavity 66. The diesel fuel cavity 66 is in fluid communication with the diesel fuel supply passage 54. Similarly the gaseous fuel cavity 68 is in fluid communication with the gaseous fuel supply passage 56. The nozzle assembly 58 further includes a nozzle tip 70.

The diesel fuel cavity 66 is positioned within the nozzle body 64 such that it is concentric to the gaseous fuel cavity 68. However, there is minimal commingling of the diesel fuel in the diesel fuel cavity 66 and the gaseous fuel in the gaseous fuel cavity 68. In particular, gaseous check needle assembly 62, fuel separator 71 and hydraulic lock assembly 72 function to keep the gaseous and diesel fuels separated within the injector 12.

Gaseous check needle assembly 62 includes a gaseous check needle 80. Gaseous check needle 80 defines an interior space 82. Gaseous check needle 80 further includes a flange 84. A biasing spring 88 is positioned between the lower surface 69 of diesel check needle guide 67 of the diesel fuel cavity 66 and flange 84. Gaseous check needle 80 is movable between a first position, wherein it at least partially blocks fluid communication between gaseous fuel disposed in the gaseous fuel cavity 68 and a gaseous orifice 92 in the nozzle tip 70, and a second position wherein it at least partially unblocks fluid communication between gaseous fuel disposed in the gaseous fuel cavity 68 and a gaseous orifice 92 in the nozzle tip 70. Biasing spring 88 biases gaseous check needle 80 toward its first position. Those skilled in the art will recognize that nozzle tip 70 may include multiple gaseous orifices 92.

Gaseous check needle 80 may further include opening hydraulic surfaces 81 and closing hydraulic surfaces 83. Opening hydraulic surfaces 81 may be exposed to gaseous fuel in the gaseous fuel cavity, and closing hydraulic surfaces 83 may be exposed to diesel fuel in the diesel fuel cavity 66. When desired, gaseous fuel acting on the opening hydraulic surfaces 81 may assist the movement of gaseous check needle 80 from its first position to its second position. Similarly, when desired, diesel fuel acting on closing hydraulic surfaces 83 may assist in moving gaseous check needle 80 from its second position to its first position.

Gaseous check needle 80 may be positioned within nozzle body 64 such that gaseous check needle control chamber 94 is formed. A shoulder 96 and an interior portion 98 of nozzle body 64 may define gaseous check needle control chamber 94. Gaseous check needle control chamber 94 is in fluid communication with diesel fuel supply passage 54 via diesel fuel cavity 66 and a gaseous z-orifice 100. Gaseous check needle control chamber 94 is also in selective fluid communication with a drain 102, via a gaseous a-orifice 104 and a gaseous check needle control line 106. As will be discussed in greater detail below, gaseous control valve assembly 32 controls the selective fluid communication between gaseous check needle control chamber 94 and drain 102.

A diesel check needle assembly 60 may include a diesel check needle 74. Diesel check needle 74 may be positioned within the interior space 82 of gaseous check needle 80. An upper portion 90 of the diesel check needle 74 is disposed within a bore 109 defined by the diesel check needle guide 67. Diesel check needle 74 may further include a first flange 75. A biasing spring 76 is positioned between the lower surface 69 of diesel check needle guide 67 of the diesel fuel cavity 66 and first flange 75. Diesel check needle 74 is movable between a first position, wherein it at least partially blocks fluid communication between diesel fuel disposed in the diesel fuel cavity 66 and a diesel orifice 108 in the nozzle tip 70, and a second position wherein it at least partially unblocks fluid communication between diesel fuel disposed in the diesel fuel cavity 66 and a diesel orifice 108 in the nozzle tip 70. Biasing spring 76 biases diesel check needle 74 toward its first position. Those skilled in the art will recognize that nozzle tip 70 may include multiple diesel orifices 108.

Diesel check needle 74 may further include opening hydraulic surfaces 77 and closing hydraulic surfaces 78. Opening hydraulic surface 77 may be exposed to diesel fuel in the diesel fuel cavity 66. Closing hydraulic surface 78, which may be referred to as the upper surface of the diesel check needle 74, may be exposed to diesel fuel in the diesel check needle control chamber 120. When desired, diesel fuel acting on the opening hydraulic surfaces 77 may assist the movement of diesel check needle 74 from its first position to its second position. Similarly, when desired, diesel fuel acting on closing hydraulic surface 78 may assist in moving diesel check needle 74 from its second position to its first position.

Diesel check needle 74 may further include a second flange 110. A second biasing spring 112 may be positioned between the second flange 110 and a first end 114 of fuel separator 71. The second biasing spring 112 biases the fuel separator 71 such that a second end 116 is in substantially constant sealing contact with the nozzle tip 70. The second end 116 of fuel separator 71 is positioned on nozzle tip 70 such that commingling of diesel fuel and gaseous fuel is substantially prevented.

Figure 6:
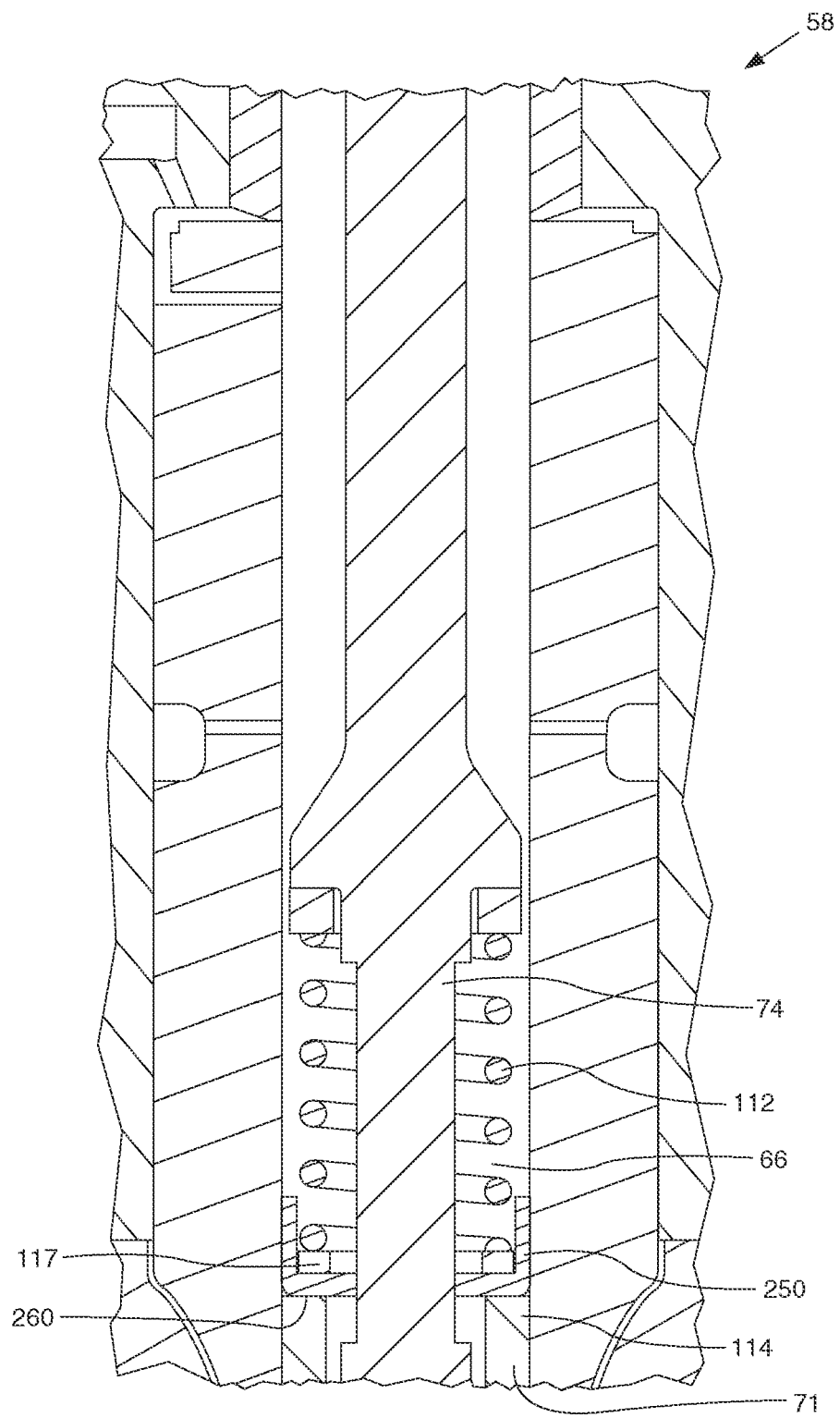
FIG. 6 illustrates an embodiment of the dual fuel injector showing an exploded view of a portion of the nozzle assembly that includes at least one sealing member.

FIG. 6 illustrates an embodiment of a dual fuel injector 12 showing an exploded view of a portion of the nozzle assembly 58 that includes at least one sealing member 250 configured to prevent diesel fuel from leaking from the diesel fuel cavity 66 into the gaseous orifice 92 (FIG. 3). In this embodiment, sealing member 250 is disposed in a constant line of contact around an interior of the diesel fuel check cavity 66 at a junction 260 atop the first end 114 of the fuel separator 71 and a bottom end 117 of the second biasing spring 112. The sealing member 250 can be configured as an inserted seal that fits snuggly within the diesel fuel cavity 66 at the junction 260 that forms a confluence of the first end 114 of the fuel separator 71 and a bottom end 117 of the second biasing spring 112. A tight seal is maintained at the junction 260 due, in part, to the constant line contact.

Figure 7:
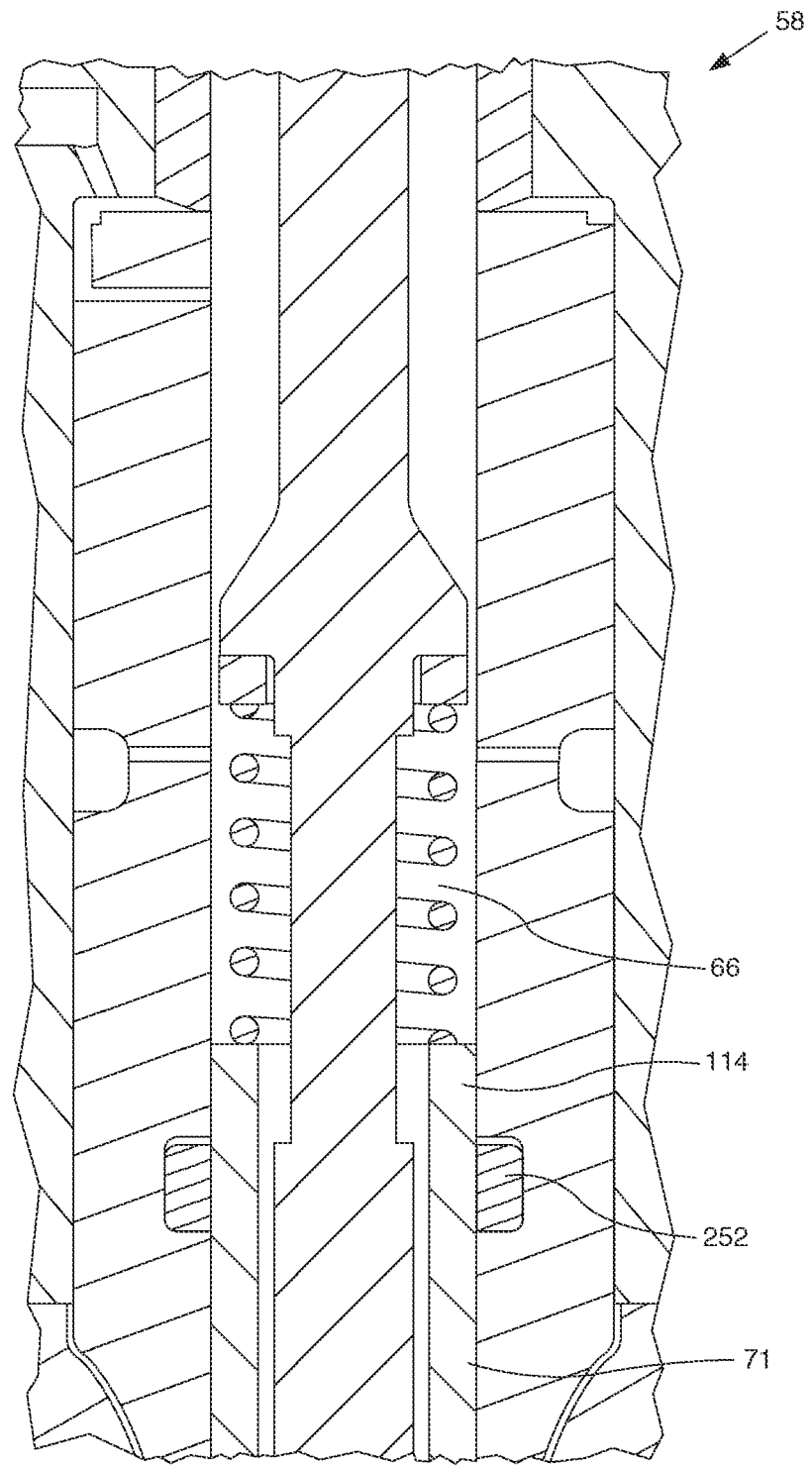
FIG. 7 illustrates another embodiment of the dual fuel injector showing an exploded view of a portion of the nozzle assembly that includes at least one sealing member.

FIG. 7 illustrates another embodiment of a dual fuel injector 12 showing an exploded view of a portion of the nozzle assembly 58 that includes at least one sealing member 252 configured to prevent diesel fuel from leaking from the diesel fuel cavity 66 into the gaseous orifice 92 (FIG. 3). Sealing member 252 can be disposed in a constant line of contact around an exterior portion of the fuel separator 71 between the first end 114 of the fuel separator 71 and the second end 116 (see FIG. 3) of the fuel separator 71. The sealing member 252 can be configured as a modified sleeve that fits tightly around the fuel separator 71.

Figure 8:
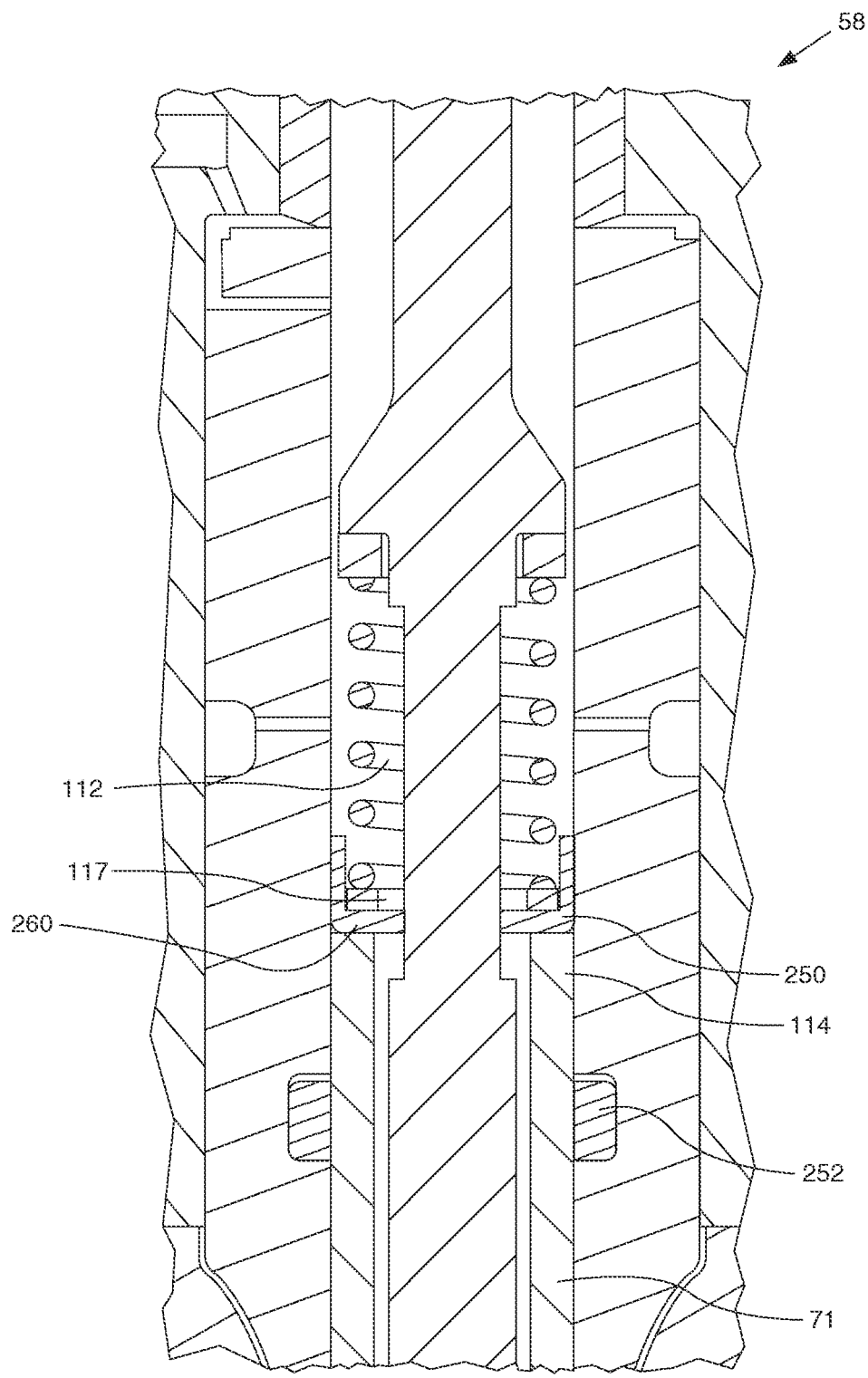
FIG. 8 illustrates another embodiment of the dual fuel injector having a combination of the sealing members disclosed in FIGS. 6 and 7.

FIG. 8 illustrates another embodiment of the dual fuel injector having a combination of the sealing members disclosed with respect to FIGS. 6 and 7. Specifically, the injector 12 can be configured with both sealing member 250 and sealing member 252 such that sealing member 250 may be disposed in a constant line of contact around an interior of the diesel fuel check cavity 66 at a junction 260 atop the first end 114 of the fuel separator 71 and a bottom end 117 of the second biasing spring 112. Further, sealing member 252 can be disposed in a constant line of contact around an exterior portion of the fuel separator 71 between the first end 114 of the fuel separator 71 and the second end 116 (FIG. 3) of the fuel separator 71.

Referring back to FIGS. 4 and 5, nozzle assembly 58 further includes an orifice plate 118. Orifice plate 118 is positioned atop diesel check needle guide 67 such that a diesel check needle control chamber 120 is defined. Specifically, diesel check needle control chamber 120 is partially defined by a lower surface 122 of the orifice plate 118, an upper surface 124 of diesel check needle guide 67, and an upper surface 78 of diesel check needle 74. Diesel check needle control chamber 120 is in fluid communication with diesel fuel supply passage 54 via a diesel z-orifice 128. Diesel check needle control chamber 120 is also in selective fluid communication with drain 102 via a diesel a-orifice 130 and a diesel check needle control line 132. Both diesel z-orifice 128 and diesel a-orifice 130 may be defined by orifice plate 118. As will be discussed in greater detail infra, diesel control valve assembly 30 controls the selective fluid communication between diesel check needle control chamber 120 and drain 102.

Turning now the various passages that facilitate the movement of both diesel and gaseous fuels throughout the various parts of the injector. Those skilled in the art will readily understand that diesel fuel from dual fuel inlet 52 travels to the diesel fuel cavity 66 via the diesel fuel supply passage 54. Diesel fuel supply passage 54 is made up of several interconnecting passages found in the injector body 50, orifice plate 118, diesel check needle guide 67, and nozzle body 64. Likewise, gaseous fuel travels from the dual fuel inlet 52 to the gaseous fuel cavity 68 via the gaseous fuel supply passage 56. Gaseous fuel supply passage 56 is made up of several interconnecting passages found in the injector body 50, orifice plate 118, diesel check needle guide 67 and nozzle body 64.

A hydraulic lock assembly 72 may further be defined within nozzle body 64. The hydraulic lock assembly 72 may include a ring cavity 134 defined by the nozzle body 64. Ring cavity 134 may encompass gaseous check needle 80. Hydraulic lock assembly may further include at least one passage 135 that facilitates fluid communication between the diesel fuel cavity 66 and the ring cavity 134. As the gaseous check needle reciprocates between its first and second positions, gaseous fuel from the gaseous fuel cavity 68 may begin to migrate up the exterior surface 85 of the gaseous check needle 80. In the absence of a hydraulic lock assembly, this migrating gaseous fuel may eventually begin to commingle with the diesel fuel in the diesel fuel cavity. Such commingling is undesired. The hydraulic lock assembly 72 prevents this undesired effect because the diesel fuel within the diesel fuel cavity 66 is at a pressure that is higher than that of the pressure of the gaseous fuel in the gaseous fuel cavity 68. Ideally, this pressure difference is about 5 MPa. Thus, as gaseous fuel seeks to migrate up the exterior surface 85 of the gaseous check needle 80, the higher pressure of the diesel fuel in the hydraulic lock assembly 72 prevents the gaseous fuel from traveling up to the diesel fuel cavity 66.

The diesel control valve assembly 30 and gaseous control valve assembly 32 control the operation of the injector 12. More specifically, the diesel control valve assembly 30 controls the injection of diesel fuel, and the gaseous control valve assembly 32 controls the injection of gaseous fuel. The diesel control valve assembly 30 is at least partially disposed within the injector body 50, and includes a control valve 136 coupled to an armature 138. The control valve 136 may be a two-way valve that moves between a closed position and an open position. Control valve 136 may be normally biased toward the closed position by a biasing spring 140 and piston 142. In the closed position, fluid communication between the diesel check needle control chamber 120 and a drain 102 is blocked. When the control valve 136 is in the open position, fluid communication between the diesel check needle control chamber 120 and the drain 102 is established. More specifically, diesel fuel from the diesel check needle control chamber 120 may travel up the diesel check needle control line 132, across the control valve 136, and out drain 102.

The diesel control valve assembly 30 further includes an electrical actuator 144. Electrical actuator 144 may be a solenoid that, when energized, creates an electromagnetic field that causes armature 138 and the coupled control valve 136 to lift by overcoming the downward forces applied by biasing spring 140 and piston 142. When this occurs, control valve 136 is moved to its open position and fluid communication between the diesel check needle control chamber 120 and the drain 102. When electrical actuator 144 is deenergized, the electromagnetic field dissipates and the downward forces applied by biasing spring 140 and piston 142 cause armature 138 and the coupled control valve 136 to return to their original closed position. In this closed position, fluid communication between the diesel check needle control chamber 120 and the drain 102 is blocked. Those skilled in the art will recognize that the configuration of the diesel control valve assembly 30 may be done in a variety of ways without departing from the scope of the present disclosure. For example, the control valve could be a three way valve, the electrical actuator may be of a piezo type, or multiple biasing springs or pistons could be employed.

Although the gaseous control valve assembly 32 is configured to control the injection of gaseous fuel, it too uses diesel fuel as the control medium. The gaseous control valve assembly 32 may also be at least partially disposed within the injector body 50. The gaseous control valve assembly 32 includes a control valve 146 coupled to an armature 148. The control valve 146 may be a two way valve that moves between a closed position and an open position. Control valve 146 may be normally biased toward the closed position by a biasing spring 150 and piston 152. In the closed position, fluid communication between the gaseous check needle control chamber 94 and the drain 102 is blocked. When control valve 146 is in the open position, fluid communication between gaseous check needle control chamber 94 and the drain 102 is established. More specifically, diesel fuel from the gaseous check needle control chamber 94 may travel up the gaseous check needle control line 106, across the control valve 146, and out drain 102.

The gaseous control valve assembly 32 further includes an electrical actuator 154. Electrical actuator 154 may be a solenoid that, when energized, creates an electromagnetic field that causes armature 148 and the coupled control valve 146 to lift by overcoming the downward forces applied by biasing spring 150 and piston 152. When this occurs, control valve 146 is moved to its open position and fluid communication between the gaseous check needle control chamber 94 and the drain 102 is established. When electrical actuator 154 is deenergized, the electromagnetic field dissipates and the downward forces applied by biasing spring 150 and piston 152 cause armature 148 and the coupled control valve 146 to return to their original closed position. In this closed position, fluid communication between the gaseous check needle control chamber 94 and the drain 102 is blocked. Those skilled in the art will recognize that the configuration of the gaseous control valve assembly 32 may be done in a variety of ways without departing from the scope of the present disclosure. For example, the control valve could be a three way valve, the electrical actuator may be of a piezo type, or multiple biasing springs or pistons could be employed.

The operation of injector 12 will now be explained. For ease of understanding, a diesel fuel injection will first be explained, followed by that of a gaseous injection. The movement of diesel check needle 74 from its first position to its second position is controlled in part by the presence of high pressure diesel fuel in diesel fuel supply passage 54, the diesel fuel cavity 66, diesel check needle control chamber 120, and the diesel check needle control line 132. Biasing spring 76 also plays a role in the movement of diesel check needle 74 from its first position to its second position. When an injection of diesel fuel is not desired, the electrical actuator 144 of the diesel control valve assembly 30 is not energized. Pressurized diesel fuel is delivered to injector 12 via a quill assembly 24. Diesel fuel, which is at a pressure higher than that of gaseous fuel, may be delivered via first quill tube 26. First quill tube 26 may be disposed within a second quill tube 28. Diesel fuel enters the injector 12 via a dual fuel inlet 52. As shown in FIGS. 1-3, dual fuel inlet 52 may be configured to receive diesel fuel from the inner or first quill tube 26 of quill assembly 24. However, those skilled in the art will recognize that the quill assembly 24 and the dual fuel inlet 52 may also both be configured to respectively deliver and receive diesel fuel via the outer or second quill tube 28 of the quill assembly 24. Once pressurized diesel fuel enters the dual fuel inlet 52, it is delivered to the diesel fuel cavity 66 via the diesel fuel supply passage 54. A portion of the diesel fuel from the diesel fuel supply passage 54 travels through the diesel z-orifice 128, diesel check needle control chamber 120, and diesel a-orifice 130 to back fill the diesel check needle control line 132. Because the electrical actuator 144 is deenergized, diesel fuel may not cross the control valve 136. Thus, diesel fuel also quickly back fills the diesel check needle control chamber 120. In this state, there are essentially two forces operating to keep the diesel check needle 74 in its first position. The first force is the downward force applied by biasing spring 76. The second force is the downward force applied by the pressurized diesel fuel in the diesel check needle control chamber 120. This second downward force is applied directly to the upper surface 78 of the diesel check needle 74. As long as the electrical actuator 144 is deenergized, these two forces are greater than the sum of the forces seeking to move the diesel check needle 74 to its second position. Thus, injection of diesel fuel is prevented.

When injection of diesel fuel is desired, the electrical actuator 144 of diesel control valve assembly 30 is energized, thus creating an electromagnetic field. The electromagnetic field attracts armature 138 and the coupled control valve 136. The attracting force of the electromagnetic field is sufficient to overcome the downward force of biasing spring 140, causing the armature 138 and control valve 136 to lift. As control valve 136 moves to its open position, fluid communication between the diesel check needle control chamber 120 and the drain 102 is established. Thus, the pressurized diesel fuel from the diesel check needle control chamber 120 travels through the diesel a-orifice 130, up the diesel check needle control line 132, across control valve 136, and out the drain 102. As this occurs, pressure within the diesel check needle control chamber 120 drops and the downward force caused by the pressure is reduced. Now, the overall downward forces applied to the diesel check needle 74 are less than the upward forces applied by the diesel fuel to the opening hydraulic surfaces 77 applied to diesel check needle assembly. Thus, the diesel check needle 74 lifts and diesel fuel is injected via the at least one diesel orifice 108.

When it is desirable to stop the injection of diesel fuel, electrical actuator 144 is deenergized. As the electromagnetic field generated by electrical actuator 144 dissipates, the force of biasing spring 140 acts on piston 142 pushing control valve 136 downward. Thus, control valve 136 is returned to its closed position, wherein fluid communication between the diesel check needle control chamber 120 and the drain 102 is blocked. When this occurs, diesel fuel is once again allowed to fill the diesel check needle control line 132 and back fill the diesel check needle control chamber 120. Thus, pressure within the diesel check needle control chamber 120 is increased. When this occurs, the downward forces applied to the diesel check needle assembly 60 are greater than the upward forces. The diesel check needle 74 returns to its first position, wherein the at least one diesel orifice 108 is blocked, thus ending the diesel injection event.

An injection of gaseous fuel is similar to that of diesel fuel. However, as will be seen, there are some important differences. For example, although gaseous fuel is being injected, diesel fuel plays a large role in the movement of gaseous check needle 80 from its first position to its second position. When an injection of gaseous fuel is not desired, electrical actuator 154 of the gaseous control valve assembly 32 is not energized. Pressurized gaseous fuel is delivered to the injector 12 via the second quill tube 28 of the quill assembly 24. Gaseous fuel enters the dual fuel inlet 52, wherein it is delivered to the gaseous fuel cavity 68 via the gaseous fuel supply passage 56. Diesel fuel, which enters the dual fuel inlet 52, is supplied to the gaseous check needle control line 106 via the diesel fuel supply passage 54, the gaseous z-orifice 100, the gaseous check needle control chamber 94, and the gaseous a-orifice 104. Due to the fact that the electrical actuator 154 is deenergized, biasing spring 150 and piston 152 work to keep control valve 146 in its closed position, thereby preventing diesel fuel from crossing control valve 146. Thus, diesel fuel quickly back fills the gaseous check needle control chamber 94. In this state, there are essentially two forces operating to keep the gaseous check needle 80 in its first position. The first force is the downward force applied by biasing spring 76. The second force is the downward force applied by the pressurized diesel fuel in the gaseous check needle control chamber 94. As long as the electrical actuator 154 is deenergized, these two forces are greater than the sum of the forces seeking to move gaseous check needle 80 to its second position. Thus, injection of gaseous fuel is prevented.

When injection of gaseous fuel is desired, the electrical actuator 154 of gaseous control valve assembly 32 is energized, thus creating an electromagnetic field. The electromagnetic field attracts armature 148 and the coupled control valve 146. The attracting force of the electromagnetic field is sufficient to overcome the downward of biasing spring 150 and piston 152, causing the armature 148 and control valve 146 to lift. As control valve 146 moves to its open position, fluid communication between the gaseous check needle control chamber 94 and the drain 102 is established. Thus, pressurized diesel fuel from the gaseous check needle control chamber 94 travels through the gaseous a-orifice 104, up the gaseous check needle control line 106, across control valve 146, and out drain 102. As this occurs, pressure within the gaseous check needle control chamber 94 drops and the downward force caused by that pressure is reduced. At this point, the overall downward forces applied to the gaseous check needle 80 are less than the upward forces applied by the gaseous fuel to the opening hydraulic surfaces 81 of the gaseous check needle 80. Thus the gaseous check needle 80 lifts and moves to its second position and gaseous fuel is injected via the at least one gaseous orifice 92.

During a diesel injection event, fuel separator 71 minimizes commingling of diesel and gaseous fuels at nozzle tip 70. Specifically, second biasing spring 112, which is positioned between second flange 110 and the first end 114 of fuel separator 71, biases fuel separator 71 downward. Thus, the second end 116 of fuel separator 71 is in substantially constant sealing contact with nozzle tip 70. Even during a diesel injection event, where the diesel check needle 74 is in its second position, second biasing spring 112 still biases fuel separator 71 downward such that diesel fuel in the diesel fuel cavity 66 is substantially prevented from commingling with gaseous fuel in the gaseous fuel cavity 68.

When it is desirable to stop the injection of gaseous fuel, electrical actuator 154 is deenergized. As the electromagnetic field generated by electrical actuator 154 dissipates, the force of biasing spring 150 acts on piston 152 pushing control valve 146 downward. Thus, control valve 146 is returned to its closed position, wherein fluid communication between the gaseous check needle control chamber 94 and the drain 102 is blocked. When this occurs, diesel fuel is once again allowed to fill the gaseous check needle control line 106 and back fill the gaseous check needle control chamber 94. Thus, pressure within the gaseous check needle control chamber 94 is increased. When this occurs, the downward forces applied to the gaseous check needle 80 are greater than the upward forces. The gaseous check needle 80 returns to its first position, wherein the gaseous orifice 92 is blocked; thus ending the gaseous injection event.

As previously mentioned, the injection of gaseous fuel is largely controlled by diesel fuel moving into and out of the gaseous check needle control chamber 94. The selection of diesel fuel as a control medium is largely due to the fact that diesel fuel is much more viscous than gaseous fuels. Thus, diesel fuel acts as an excellent lubricant. This increased lubricity helps protect the sensitive surfaces of the gaseous control valve assembly 32. Those skilled in the art will also recognize that the same lubricity benefits also apply to the diesel control valve assembly 30.

The viscous nature of diesel fuel also has benefits with respect to injector tips. Gaseous fuels may cause excessive tip wear because of their low viscosity and low bulk modulus. This excessive wear can lead to tip failure, and ultimately failure of the injector. To combat this issue in the present injector 12, small amounts of diesel fuel are permitted to leak into the gaseous fuel cavity 68. This is accomplished through the hydraulic lock assembly 72. Diesel fuel pressure within dual fuel common rail fuel system 10 is higher than that of gaseous fuel. Ideally, the pressure difference is approximately 5 MPa. Because of this pressure difference, small amounts of diesel fuel delivered to the ring cavity 134 of the hydraulic lock assembly 72, seep into the gaseous fuel cavity 68. This small amount of diesel fuel lubricates exterior surface 85 of gaseous check needle 80 as it reciprocates between its first and second positions.

INDUSTRIAL APPLICABILITY

The dual fuel injector of the present disclosure finds general applicability to any engine that can independently receive two fluids (e.g., diesel and natural gas). These two fuels may be the same fuel at two different pressures, or may, as in the illustrated embodiment, be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from diesel fuel rail 20.

In FIG. 6, the sealing member 250 is configured to substantially prevent diesel fuel from leaking from the diesel fuel cavity 66 into the gaseous orifice 92. The sealing member 250 is maintained at the junction 260 and is configured to have a constant line of contact around the diesel cavity 66 region. In this manner, diesel fuel leaks may be substantially prevented from percolating or dripping from the diesel fuel cavity 66 and draining along the fuel separator 71 into the combustion chamber, via the gaseous orifice 92. Thus, unnecessary smoking resulting from unburnt diesel fuel that dribbles into the combustion chamber can be substantially prevented from occurring. Further, sealing member 250 can function to substantially prevent combustion gases from entering the injector 12 and mixing with diesel fuel in the diesel fuel cavity 66, as could otherwise occur after ignition.

In FIG. 7, sealing member 252 in injector 12 is also configured to prevent diesel fuel from leaking from the diesel fuel cavity 66 into the gaseous orifice 92. As with sealing member 250, sealing member 252 can be configured as a dynamic seal or static seal that can both be adapted to withstand rapid pressure changes within the injector 12. Sealing member 252 can be adapted as an o-ring that is capable of providing a constant seal in environments where there can be rapid temperature and pressure changes. Similar to sealing member 250 in FIG. 6, sealing member 252 also serves to substantially prevent diesel fuel leaks from percolating or dripping from the diesel fuel cavity 66 and draining along the fuel separator 71 into the combustion chamber, via the gaseous orifice 92. Also, sealing member 252 may function to substantially prevent combustion gas intrusion into the injector 12 from the combustion chamber that can occur, for example, after ignition.

In addition, FIG. 8 illustrates an embodiment in which the dual fuel injector 12 can combine the use of sealing members 250 and 252 to substantially prevent diesel fuel from draining into the combustion chamber via gaseous orifice 92, as well as preventing combustion gas intrusion into the injector 12 from the combustion chamber after ignition. Sealing members 250 and 252 may be configured as an inserted seal and as a modified sleeve, respectively.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A dual fuel injector, comprising:
   an injector body configured to receive a first fuel and a second fuel;
   a nozzle having a first set of orifices for injecting the first fuel and a second set of orifices for injecting the second fuel;
   a first fuel check needle disposed in a first fuel check cavity, and wherein the first fuel check needle defines an interior cavity;
   a second fuel check needle positioned within the interior cavity of the first fuel check needle and wherein the second fuel check needle is movable within a second fuel check cavity;
   a fuel separator having a first end and a second end, the fuel separator disposed in the interior cavity between the first fuel check needle and the second fuel check needle, the second end of the fuel separator disposed in sealing contact with the nozzle and configured to prevent commingling of the first fuel and the second fuel; and
   at least one sealing member configured to prevent the second fuel from leaking from the second fuel check cavity into the first set of orifices, the at least one sealing member contacting an internal surface of the first fuel check needle and a surface of the fuel separator, and the at least one sealing member is at least one of arranged between the fuel separator and a fuel separator biasing spring in contact with the fuel separator or arranged in a groove in the first fuel check needle.

2. The dual fuel injector of claim 1, further including a first biasing spring configured to bias the first fuel check needle toward a first position, and further includes a second biasing spring configured to bias the second fuel check needle toward a first position.

3. The dual fuel injector of claim 2, wherein the at least one sealing member is disposed in a constant line of contact around an exterior of the second fuel check needle at a junction between the first end of the fuel separator and a bottom end of the fuel separator biasing spring.

4. The dual fuel injector of claim 2, wherein the at least one sealing member is disposed between the fuel separator and the first fuel check needle and at a location between the first end of the fuel separator and the second end of the fuel separator.

5. The dual fuel injector of claim 2, wherein the at least one sealing member comprises:
   a first sealing member disposed in a constant line of contact around an exterior of the second fuel check needle at a junction between the first end of the fuel separator and a bottom end of the fuel separator biasing spring; and
   a second sealing member disposed between the fuel separator and the first fuel check needle and at a location between the first end of the fuel separator and the second end of the fuel separator.

6. The dual fuel injector of claim 1, wherein the injector body is configured to receive the first fuel and the second fuel delivered, via a quill, in a coaxial fashion.

7. The dual fuel injector of claim 2, wherein the second biasing spring is concentrically nested within the first biasing spring.

8. The dual fuel injector of claim 1, wherein the first fuel check needle is movable between a first position wherein the first fuel check needle blocks fluid communication with the first set of orifices, and a second position wherein the first fuel check needle at least partially allows fluid communication with the first set of orifices.

9. The dual fuel injector of claim 1, wherein the second fuel check needle is movable within the second fuel check cavity between a first position wherein the second fuel check needle blocks fluid communication with the second set of orifices, and a second position wherein the second fuel check needle at least partially allows fluid communication with the second set of orifices.

10. The dual fuel injector of claim 1, wherein the first fuel is a gaseous fuel and the second fuel is diesel fuel.

11. A dual fuel common rail fuel system comprising:
   a first fuel source;
   a second fuel source;
   a first fuel rail;
   a second fuel rail;
   at least one first fuel pump configured to pressurize a first fuel from the first fuel source and deliver the first fuel to the first fuel rail;
   at least one second fuel pump configured to pressurize a second fuel from the second fuel source and deliver the second fuel to the second fuel rail;
   a dual fuel injector fluidly coupled to the first fuel rail and to the second fuel rail, and further comprising:
   an injector body configured to receive the first fuel from the first fuel source and the second fuel from the second fuel source;
   a nozzle having a first set of orifices for injecting the first fuel and a second set of orifices for injecting the second fuel;

a first fuel check needle disposed in a first fuel check cavity, and wherein the first fuel check needle defines an interior cavity;

a second fuel check needle positioned within the interior cavity of the first fuel check needle and wherein the second fuel check needle is movable within a second fuel check cavity;

a fuel separator having a first end and a second end, the fuel separator disposed in the interior cavity between the first fuel check needle and the second fuel check needle, the second end of the fuel separator disposed in sealing contact with the nozzle and configured to prevent commingling of the first fuel and the second fuel; and at least one sealing member configured to prevent the second fuel from leaking from the second fuel check cavity into the first set of orifices, the at least one sealing member contacting an internal surface of the first fuel check needle and a surface of the fuel separator, and the at least one sealing member is at least one of arranged between the fuel separator and a fuel separator biasing spring in contact with the fuel separator or arranged in a groove in the first fuel check needle.

12. The dual fuel common rail fuel system of claim 11, further including a first biasing spring configured to bias the first fuel check needle toward a first position, and further includes a second biasing spring configured to bias the second fuel check needle toward a first position.

13. The dual fuel common rail fuel system of claim 12, wherein the at least one sealing member is disposed in a constant line of contact around an exterior of the second fuel check needle at a junction between the first end of the fuel separator and a bottom end of the second biasing spring.

14. The dual fuel common rail fuel system of claim 12, wherein the at least one sealing member is disposed between the fuel separator and the first fuel check needle and at a location between the first end of the fuel separator and the second end of the fuel separator.

15. The dual fuel common rail fuel system of claim 12, wherein the at least one sealing member comprises:

a first sealing member disposed in a constant line of contact around an exterior of the second fuel check needle at a junction between the first end of the fuel separator and a bottom end of the fuel separator biasing spring; and a second sealing member disposed between the fuel separator and the first fuel check needle and at a location between the first end of the fuel separator and the second end of the fuel separator.

16. The dual fuel common rail fuel system of claim 11, wherein the injector body is configured to receive the first fuel and the second fuel delivered, via a quill, in a coaxial fashion.

17. The dual fuel common rail fuel system of claim 12, wherein the second biasing spring is concentrically nested within the first biasing spring.

18. The dual fuel common rail fuel system of claim 11, wherein the first fuel check needle is movable between a first position wherein the first fuel check needle blocks fluid communication with the first set of orifices, and a second position wherein the first fuel check needle at least partially allows fluid communication with the first set of orifices.

19. The dual fuel common rail fuel system of claim 11, wherein the second fuel check needle is movable within the second fuel check cavity between a first position wherein the second fuel check needle blocks fluid communication with the second set of orifices, and a second position wherein the second fuel check needle at least partially allows fluid communication with the second set of orifices.

20. The dual fuel common rail fuel system of claim 11, wherein the first fuel is a gaseous fuel and the second fuel is diesel fuel.

* * * * *